H. O. HEM.
WEIGHING SCALE.
APPLICATION FILED OCT. 23, 1916.
1,369,101.
Patented Feb. 22, 1921.
4 SHEETS—SHEET 1.
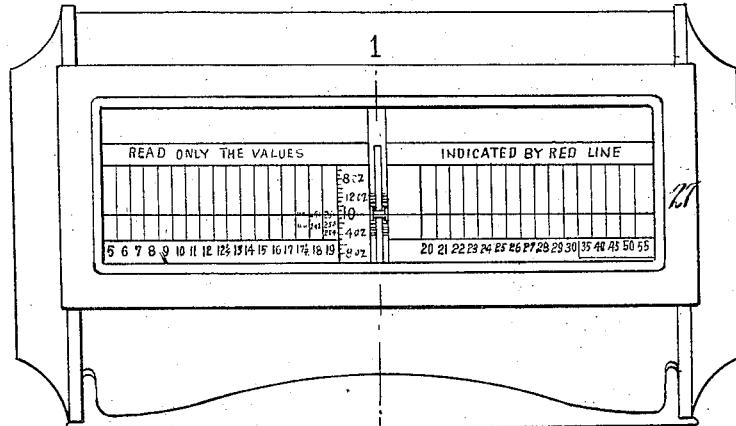
Fig. 1.
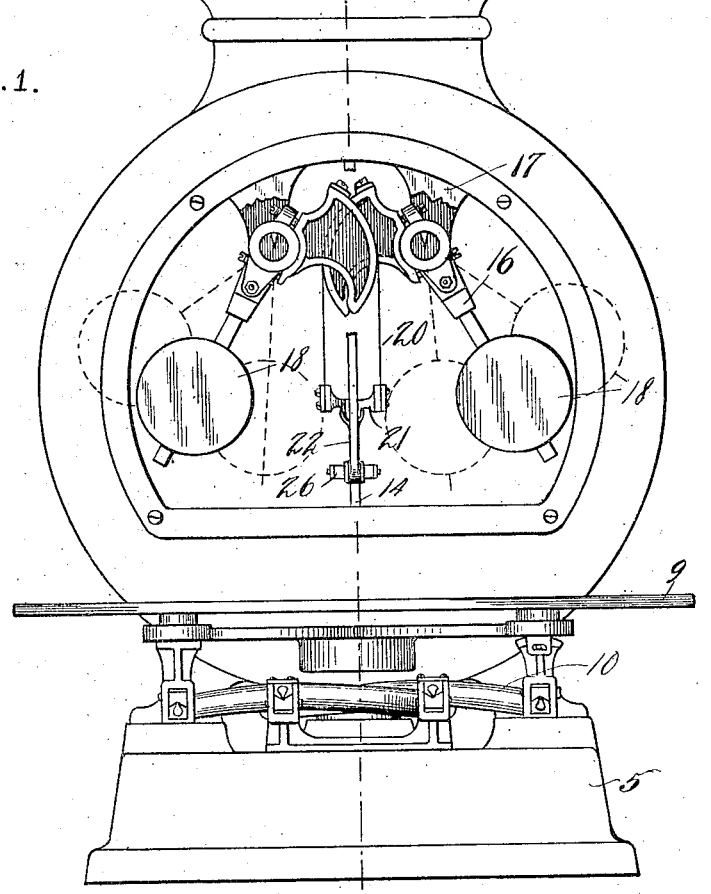
WITNESSES:
D. C. Watter
C. H. Miller
INVENTOR.
Halvor O. Hem
by George R. Frye
atty

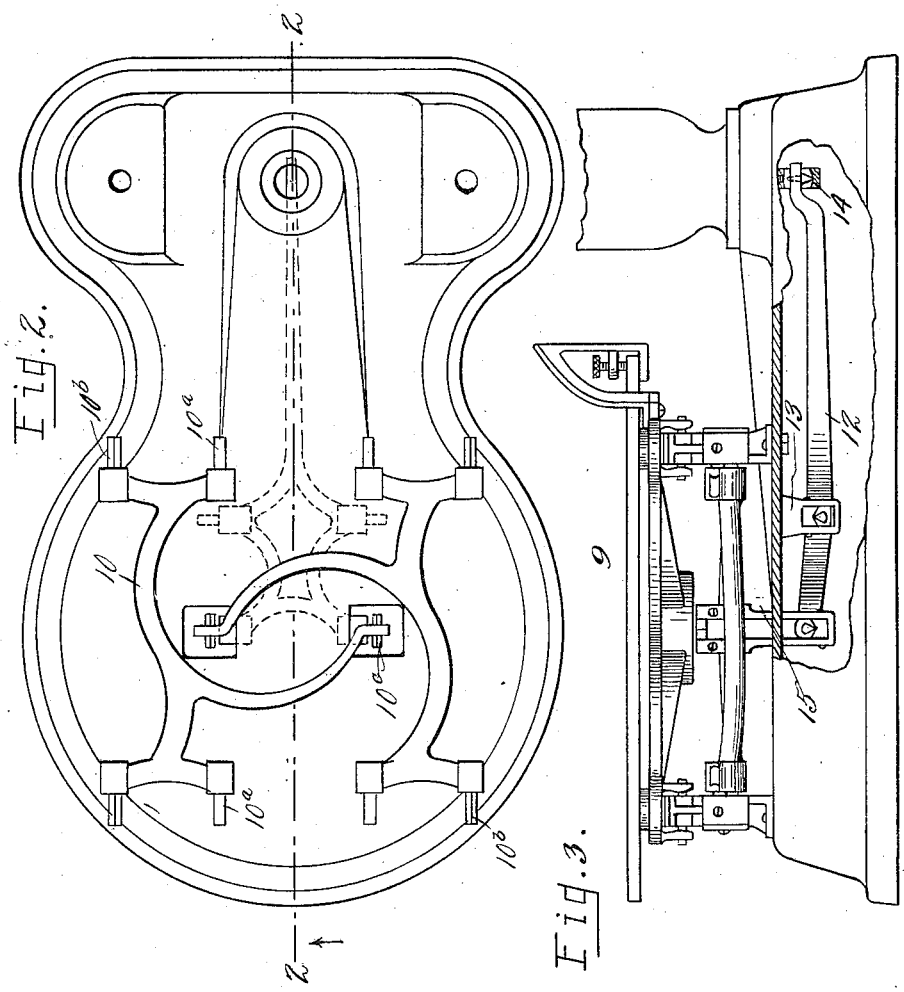

H. O. HEM.
WEIGHING SCALE.
APPLICATION FILED OCT. 23, 1916.
1,369,101.
Patented Feb. 22, 1921.
4 SHEETS—SHEET 3.
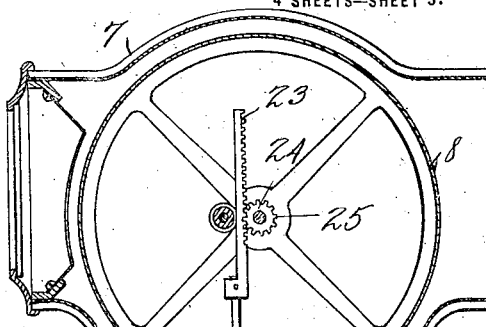
Fig. 4.
Fig. 5.   Fig. 6.
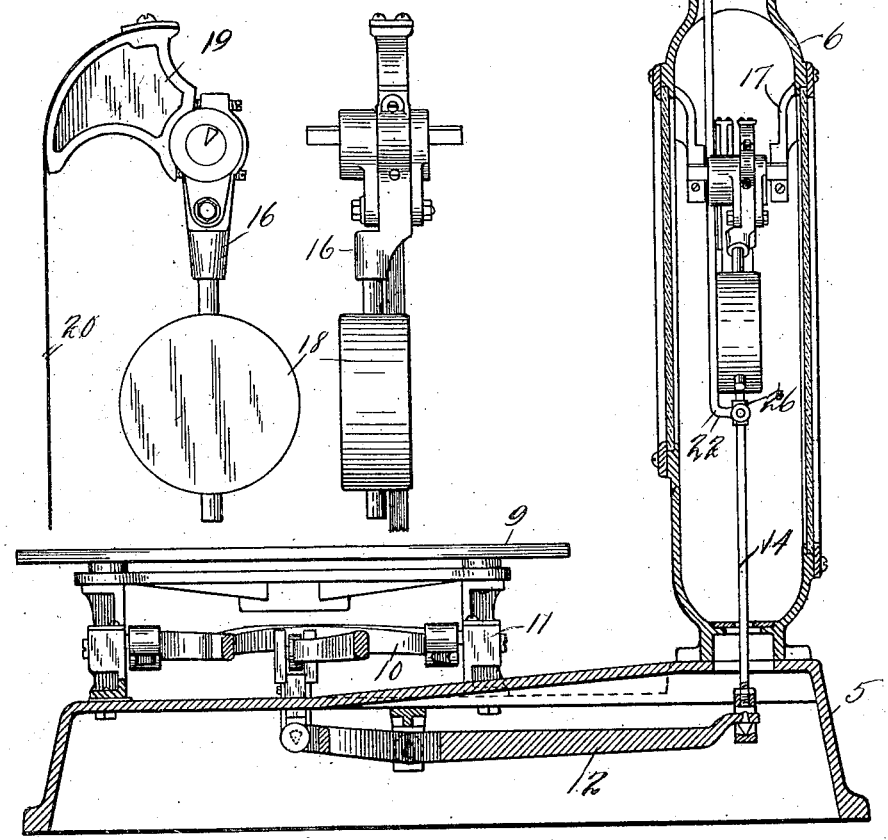
WITNESSES
C. F. Phillips
Edw. F. Ulrich.
INVENTOR
Halvor O. Hem
by George R. Frye
Atty

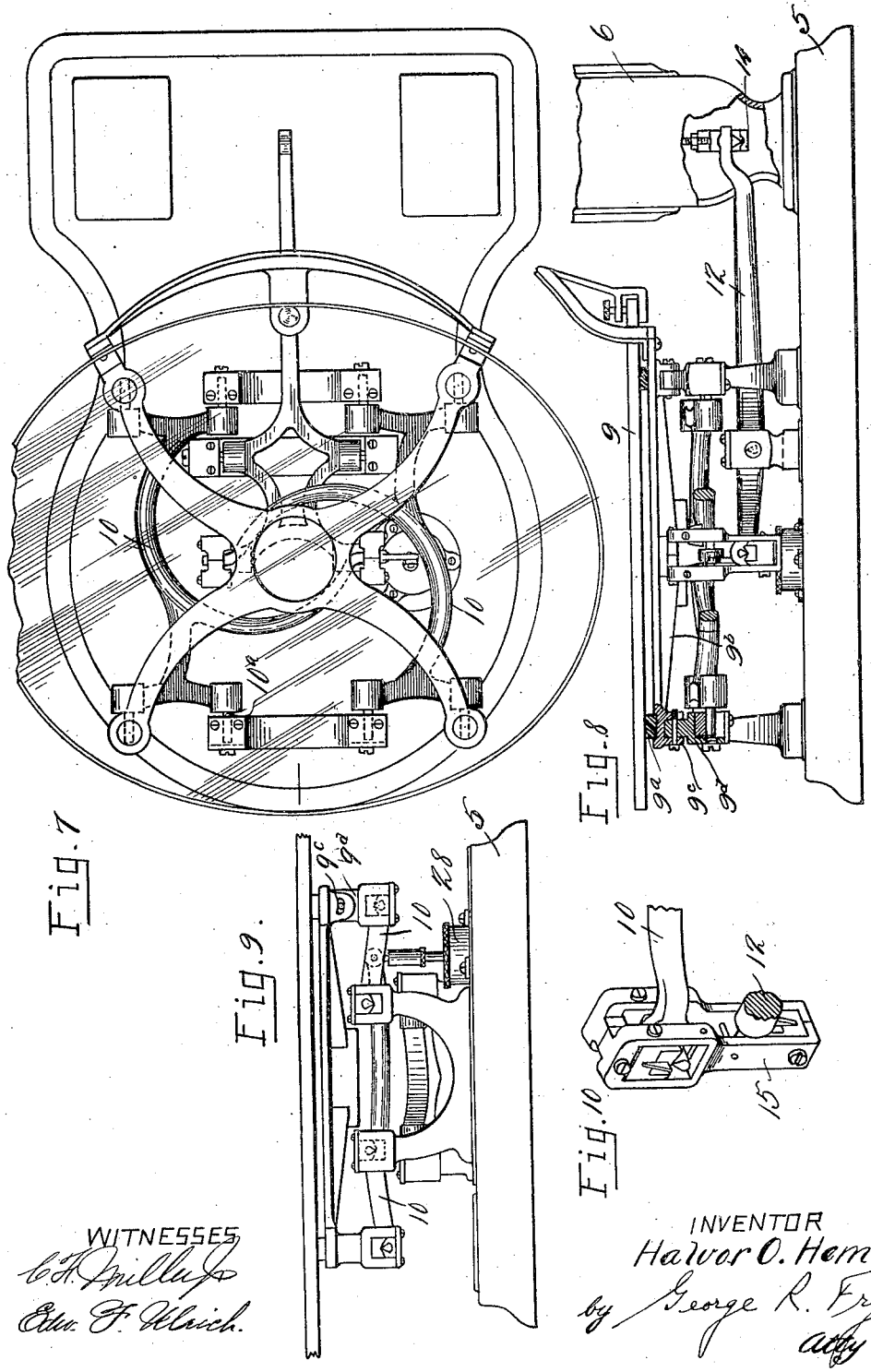

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING-SCALE.

1,369,101.  Specification of Letters Patent.  Patented Feb. 22, 1921.

Application filed October 23, 1916. Serial No. 127,257.

*To all whom it may concern:*

Be it known that I, HALVOR O. HEM, a citizen of the United States, residing at Toledo, in the county of Lucas and State of Ohio, have invented certain new and useful Improvements in Weighing-Scales, of which the following is a specification.

This invention relates to weighing scales, and more particularly to that type of weighing scales known as counter scales and adapted to rest upon the counters of stores, shops, factories and the like.

Among the objects of my invention are the provision in a weighing scale of this type of an improved platform-supporting lever mechanism enabling the use of a low platform resting at four points upon the levers and eliminating the necessity of using the check link required with a platform supported at two points only; the provision of oppositely-arranged compensating pendulums in counter scales to insure accurate weighing even when the scale is out of level in a transverse direction, and the arrangement of these pendulums with portions thereof in overlapped relation increasing the leverage distances allowed for each pendulum while maintaining a simple and compact construction.

Other objects and advantages will readily appear from the following description, in which reference is had to the drawings illustrating preferred embodiments of my invention and wherein similar reference numerals designate similar parts throughout the several views.

In the drawings:—

Figure 1 is a front elevation of a cylinder scale equipped with my improved invention; Fig. 2 is a plan view of the base and platform-supporting levers; Fig. 3 is a side elevation of the lower portion of the platform and platform-supporting lever mechanism; Fig. 4 is a central vertical section taken substantially on the line 1—1 of Fig. 1; Figs. 5 and 6 are respectively front and side elevations of one of the pendulums employed; Fig. 7 is a plan view of the base and platform mechanism of another embodiment of my invention; Fig. 8 is a side view, with parts broken away and in section, of the construction shown in Fig. 7; Fig. 9 is a front view of the base and platform lever mechanism; and Fig. 10 is a perspective view of the link connecting the upper and lower levers of the platform-supporting mechanism.

In the drawings I have shown one form of counter scale that has become well-known to the public through long continued use and many prior patents, and which embodies a rotating cylinder bearing weight and value computations thereon adapted to be rotated upon the movement of the platform lever mechanism, which in turn exerts a pull upon the pendulums forming the load-offsetting mechanism. It is to be understood, however, that this form of scale is illustrated merely by way of example and that this invention is capable of use in a number of different types of weighing scales.

In the illustrated embodiment, the base 5 supports adjacent its rear extremity a casing 6 upon which rests the housing 7 adapted to inclose the rotating cylinder 8 bearing the weight and value indications. The platform 9 is supported upon a pair of oppositely-disposed transversely-arranged supporting levers 10 which are fulcrumed upon spaced brackets 11 arranged transversely of the scale base. As herein shown, these supporting levers 10 are of the first order, the fulcrum pivots 10$^a$ being arranged intermediate the pivots 10$^b$ through which connection is made with the platform 9 and the pivot 10$^c$ through which connection is made with a lower auxiliary lever 12. This auxiliary lever is likewise formed as a lever of the first order and is arranged with the knife edges of its fulcrum pivots directed upwardly and contacting with bearings formed in brackets 13 carried by the scale base, the opposite ends of the lever being provided with pivots through which connection is made with the platform-supporting levers and the steelyard rod 14. A link 15 (see Fig. 10) having upper and lower bearings arranged at right angles to each other is preferably provided for connecting the inner extremities of the platform-supporting levers 10 with the forward extremity of the lower auxiliary lever 12. In the construction illustrated in Figs. 1-6 inclusive the lower auxiliary lever is inclosed within the base 5 whereby the platform 9 is positioned a relatively short distance above the scale base, and the casing 6 of the scale may be completely closed at all exposed parts, the steelyard rod 14 passing through an opening in the base of the casing and connecting with the lever 12. This construction is, however, optional with that of arranging the lower auxiliary lever above the scale base and extending it through a slot formed in the front of the casing 6 to effect its junction with the steelyard rod 14, as, for example, shown in Figs. 7–9. The platform 9 preferably comprises a plate or disk of glass, metal or other substance adapted to rest upon rubber bumpers $9^a$ carried by the spider $9^b$, which is provided with four depending apertured brackets $9^c$ arranged substantially as shown in Figs. 7 and 8 and pivotally supporting depending links $9^d$ carrying V-notched bearings adapted to rest upon the platform-supporting pivots $10^b$ of the levers 10. As the platform descends upon the rocking of the levers 10 under the imposition of a load placed on the platform, the links $9^d$ will swing to allow for the curvature of the path of movement of the platform-supporting pivots without affecting the normally horizontal position or the vertical movement of the platform. If desired, only the links $9^d$ on one side of the platform may be pivotally supported within the brackets $9^c$, this construction being shown in Fig. 9 of the drawings, and to insure the maintenance of the platform during the full travel of the levers 10 the slot in said bracket is elongated substantially as shown. Preferably each link $9^d$ is provided with a curved upper extremity having the knife edge of the pivot with which it co-acts as a center and adapted to be engaged by the depending bracket $9^c$ of the platform spider, this construction allowing the link $9^d$ to rock during the necessary travel of the platform and lever mechanism and at the same time provide a direct bearing of the platform spider in vertical alinement with the knife edge pivot of the platform-supporting levers. The elongated apertures in the brackets $9^c$ also aid in guiding the links $9^d$ during this rocking movement.

The load-offsetting mechanism of the scale preferably comprises a pair of oppositely-disposed pendulums 16 fulcrumed upon bearings carried by brackets 17 in the front and rear portions of the casing 6. One arm of each pendulum carries the pendulum ball 18 while the other arms thereof are formed as cams 19 arranged side by side in overlapping relation and provided with arcuate faces adapted to coöperate with the flexible ribbons 20 of steel or other suitable material, which pass over the arcuate faces of the cams 19, being secured at their upper extremities to said cams and at their lower ends to the opposite sides of the equalizer bar 21. As will be noted from Fig. 1 of the drawings, the cam 19 of the pendulum at the left of the figure is secured to the ribbon 20 connected with the right side of the equalizer bar 21, while the pendulum at the right of the figure is correspondingly connected with the left side of the equalizer bar. The equalizer bar 21 is pivotally connected centrally of its connections with the ribbons 20 to the steelyard rod 14, which rod also supports the lower extremity of the rack rod 22 carrying at its upper extremity the rack 23 adapted to mesh with the pinion 24 on the shaft 25 of the indicating cylinder 8. As herein shown, the lower extremity of the rack rod 22 is pivotally supported in the bracket 26 fixed on the steelyard rod adjacent its upper extremity. The indicating cylinder 8, as hereinbefore stated, is provided with weight and value indications adapted to show in coöperation with a fixed reading line 27 the weight of a commodity placed on the scale platform and the value of the commodity at various prices per pound.

Thus, in the operation of the scale, when a commodity is placed upon the platform 9 the arms of the levers 10 which are connected with the platform will be rocked downwardly and the other arms of said levers rocked in an upward direction, the upward movement of these lever arms being transmitted to the forward arm of the lower auxiliary lever 12 to swing downwardly the rear arm of this auxiliary lever which is connected with the steelyard rod 14. The downward pull exerted upon the steelyard rod is transmitted to the equalizer bar 21 to elevate the pendulums a sufficient distance to offset the weight of the commodity upon the platform, and also to proportionately lower the rack rod 22 to rotate the cylinder 8 a distance sufficient to indicate the weight of such commodity. When the commodity is removed from the platform the pendulums fall to their normal position, again raising the equalizer bar 21 and rack rod to their original positions.

To damp the movement of the weighing mechanism during the weighing operation suitable means may be provided, as, for example, the dash pot 28 mounted on the scale base and connected with one of the platform supporting levers 10.

While it will be apparent that the illustrated embodiments of my invention herein disclosed are well calculated to adequately fulfil the objects primarily stated, it is to be understood that the invention is susceptible to modification, variation and change without departing from the spirit and scope of the invention as set forth in the subjoined claims.

Having described my invention, I claim:

1. In a weighing scale, platform-supporting lever mechanism comprising a pair of transversely arranged upper levers, a platform having depending legs supported thereon, pin and slot connections affording lost motion between the platform and the legs thereof, and a lower auxiliary lever connected with the transverse levers and load-offsetting mechanism of the scale.

2. In a weighing scale, platform-supporting lever mechanism comprising a pair of transversely arranged upper levers, a platform having depending legs supported thereon, pin and slot connections between certain of the legs and the platform to allow for lost motion therebetween, and a lower auxiliary lever connected with the transverse levers and load-offsetting mechanism of the scale.

3. In a weighing scale, weighing mechanism comprising a pair of oppositely-disposed pendulums fulcrumed within the scale, segments carried by the pendulums and having portions overlapping laterally, an equalizer bar arranged centrally of the pendulum and having each side connected with the segment of the pendulum fulcrumed on the opposite side of a central plane and means for moving the equalizer bar upon the imposition of a load to be weighed upon the scale.

4. In a weighing scale, weighing mechanism comprising right and left pendulums fulcrumed within the scale, segments carried by the pendulums and extending toward each other and overlapping laterally, an equalizer bar arranged centrally of the pendulums and having its left side connected with the right pendulum and vice versa, and means for moving the equalizer bar upon the imposition of a load to be weighed upon the scale.

5. In a weighing scale, a platform, platform-supporting levers, a steelyard rod connected with the platform levers, weighing mechanism comprising a pair of oppositely-disposed pendulums having laterally spaced fulcrums and provided with power segments in partially overlapping relation, means connected with the steelyard rod and with the segments for actuating the weighing mechanism and separate means connected with the steelyard rod for actuating the indicating mechanism.

6. In a weighing scale, a platform, platform-supporting levers, a steelyard rod connected with the platform levers and the weighing mechanism, weighing mechanism comprising a pair of oppositely-disposed pendulums having adjacent segments in partially overlapping relation, a cylinder bearing weight indications pivoted within the scale and carrying a pinion, and a rack rod pivotally connected with the steelyard rod and meshing with the pinion.

7. In a weighing scale, platform-supporting lever mechanism, a platform having a plurality of legs supported upon the lever mechanism, some of said legs being formed with links having a pin and slot connection with the platform and adapted to swing relatively to the remainder of the platform mechanism.

8. In a weighing scale, platform-supporting lever mechanism, a platform having a plurality of legs supported upon the lever mechanism, some of said legs being formed with links having curved upper extremities engaging the remainder of the platform mechanism and permitting independent rocking movement of the links during the movement of the platform and lever mechanism.

9. In a weighing scale, platform-supporting lever mechanism, a platform having a plurality of legs supported upon the lever mechanism, some of said legs being formed with links having curved surfaces engaging the remainder of the platform mechanism and permitting independent rocking movement of the links during the movement of the platform and lever mechanism.

10. In a weighing scale, platform-supporting lever mechanism, a platform supported upon pivots carried thereby and having a plurality of legs, some of which are formed with link members pivotally connected with the remainder of the platform mechanism and provided with curved upper surfaces adapted to rock upon the platform to provide bearings for the platform always in vertical alinement with the platform-supporting pivots.

11. In a weighing scale, platform-supporting lever mechanism, a platform supported upon pivots carried thereby and having a plurality of legs arranged in lateral pairs, one pair of which is formed with link members pivotally connected with the remainder of the platform mechanism and provided with curved upper surfaces adapted to rock laterally upon the platform to provide bearings for the platform in vertical alinement with the platform-supporting pivots.

12. In a weighing scale, platform-supporting lever mechanism comprising three levers of the first order, two of which are arranged transversely of the third, which is widened at the point of connection with the two lateral levers, and connections between each lateral lever and the side of the third lever opposite to that adjacent which the lateral lever is fulcrumed.

13. In a weighing scale, platform-supporting lever mechanism comprising three levers of the first order, two of which are arranged transversely of the third, which is widened at the point of connection with the two lateral levers, connections between the right lateral lever and the left side of the third lever, and connections between the left lateral lever and the right side of the third lever.

14. In a weighing scale and in combination with the base, platform-supporting lever mechanism including a pair of upper levers arranged laterally on opposite sides of the base, and a lower auxiliary lever connected with the load-offsetting mechanism of the scale, connections between the right lateral lever and the left side of the third lever, and connections between the left lateral lever and the right side of the third lever.

15. In a weighing scale and in combination with a base, platform-supporting lever mechanism including a pair of upper levers arranged laterally on opposite sides of the base, and a lower auxiliary lever of the first order having its fulcrum pivots pointed upwardly and connected with the load-offsetting mechanism of the scale, connections between the right lateral lever and the left side of the third lever, and connections between the left lateral lever and the right side of the third lever.

16. In a weighing scale, weighing mechanism comprising a pair of pendulums having their fulcrums spaced laterally within the scale, segments carried by the pendulums and having portions overlapping laterally, an equalizer bar arranged centrally of the pendulums and having each side connected with the segment of the pendulum fulcrumed on the opposite side of a central plane, and means for moving the equalizer bar on the imposition of a load to be weighed upon the scale.

HALVOR O. HEM.

Witnesses:
GEORGE R. FRYE,
C. F. MILLER, Jr.